United States Patent [19]

Nakatsuno et al.

[11] Patent Number: 5,020,332
[45] Date of Patent: Jun. 4, 1991

[54] AIR CONDITIONER AND A DRIVE APPARATUS THEREFOR

[75] Inventors: Eiji Nakatsuno; Yasunori Himeno, both of Otsu; Yasuhiko Ebata, Kurita; Masatosi Nagano, Otsu, all of Japan

[73] Assignee: Matsushita Electric Industrial Co., Ltd., Osaka, Japan

[21] Appl. No.: 505,656

[22] Filed: Apr. 6, 1990

[30] Foreign Application Priority Data

| Apr. 7, 1989 | [JP] | Japan | 1-88878 |
| Apr. 7, 1989 | [JP] | Japan | 1-88883 |
| Apr. 7, 1989 | [JP] | Japan | 1-88884 |

[51] Int. Cl.⁵ ............................................ G05D 23/32
[52] U.S. Cl. ............................................ 62/157; 62/231; 236/46 R
[58] Field of Search .................... 62/231, 157, 180; 236/46 R

[56] References Cited

U.S. PATENT DOCUMENTS 4,209,995  7/1980  Ferdelman .................... 62/231

Primary Examiner—William E. Wayner
Attorney, Agent, or Firm—Wenderoth, Lind & Ponack

[57] ABSTRACT

A drive control apparatus for controlling the operation of an air conditioner comprises a 24-hour air-conditioning mode, a selector for selecting one of drive and release positions of the 24-hour air-conditioning mode, a load-responsive air-conditioning mode under which the air conditioner is operated in dependence on a load in a space to be air-conditioned, a drive control for effecting one of drive and stop controls of the load-responsive air-conditioning mode, and a preferential output unit for outputting a signal from the drive control in preference to an output signal from the selector. An output from the preferential output unit may be used to drive the operating frequency of the compressor at a predetermined number of revolution, to drive an indoor fan either continuously or intermittently at a predetermined number of revolution, and/or to deflect a vertical deflector blade to a predetermined position.

7 Claims, 12 Drawing Sheets

AIR CONDITIONER AND A DRIVE APPARATUS THEREFOR

BACKGROUND OF THE INVENTION

1. Field of the Invention

The present invention relates to an air conditioner and a drive control apparatus for the air conditioner.

2. Description of the Prior Art

It is well known that, as one of drive control means for controlling the operation of an air conditioner, an air conditioning mode is employed in which the air conditioning capability of the air conditioner is minimized to allow the air conditioner to be operated continuously.

It is also known to control both of an air conditioner compressor and the number of revolution of a fan in an indoor unit of the air conditioner in dependence on the heat load.

In either case, this type of air-conditioning mode has been employed as one of air-conditioning modes of a drive control means. In other words, even in the drive control apparatus for the air conditioner having this type of air-conditioning mode, the above described air-conditioning mode cannot operate unless the air conditioner is kept in operation by means of a drive control means used to selectively drive and stop the air conditioner, as disclosed in, for example, the Japanese Laid-open Patent Publications No. 53-53146 and No. 59-0487, published in 1978 and 1894, respectively.

FIG. 1 of the accompanying drawings illustrates a flowchart showing the sequence of operation of one embodiment of the prior art drive control apparatus for the air conditioner in which the drive control means for controlling the air conditioner is provided with an air-conditioning mode during which the air conditioning capacity is kept minimized to allow the air conditioner to operate continuously.

Referring to FIG. 1, subsequent to the start of operation, and if the selection of "DRIVE" by the drive control apparatus is "N" as determined at step 101, step 102 takes place at which the air conditioner is brought to a halt. If, however, the selection of "DRIVE" by the drive control apparatus is "Y" as determined at step 101, the program flow proceeds to step 103 at which a decision is made to determine if the selection of a continuous drive air-conditioning mode by a selector means is "Y" or "N". If the result of decision at step 103 indicate "Y" or "N", the program flow proceeds to step 104 for the continuous drive air-conditioning mode or to step 105 for an ordinary load-responsive air-conditioning mode, respectively.

FIG. 2 of the accompanying drawings illustrates a flowchart showing the sequence of operation of one embodiment of the prior art drive control apparatus for the air conditioner in which the drive control means for controlling the air conditioner provided with an air-conditioning mode during which the air conditioning capacity is kept minimized to allow the air conditioner to operate continuously is provided with an ON timer for controlling the drive control apparatus so that the air conditioner can be brought into operation at a preset hour set in the ON timer.

Referring to FIG. 2, subsequent to the start of operation of the system, and if the preset hour detected by an ON timer hour detecting means is "Y" as determined at step 201, step 202 takes place and, if the selection of the continuous drive air-conditioning mode by a selector means is "Y" as determined at step 202, the continuous drive air-conditioning is carried out at step 203. On the other hand if the selection of the continuous drive air-conditioning mode by the selector means at step 202 is "N", the ordinary load-responsive air-conditioning is carried out at step 204. If the preset hour detected by the ON timer hour detecting means at step 201 is "N", step 205 takes place. If the selection of "DRIVE" by the drive control apparatus at step 205 is "N", the air conditioner is brought to a halt at step 206. However, if the selection of "DRIVE" by the drive control apparatus at step 205 is "Y", step 207 takes place. If the selection of the continuous drive air-conditioning mode by the selector means is "Y" or "N" as determined at step 207, the continuous drive air-conditioning is carried out at step 208 or the ordinary load-responsive air-conditioning is carried out at step 209, respectively.

FIG. 3 illustrates a flowchart showing the sequence of operation of one embodiment of the prior art drive control apparatus for the air conditioner in which the drive control means for controlling the air conditioner provided with an air-conditioning mode during which the air conditioning capacity is kept minimized to allow the air conditioner to operate continuously is provided with an OFF timer for controlling the drive control apparatus so that the air conditioner can be brought to a halt at a preset hour set in the OFF timer.

Referring to FIG. 3, subsequent to the start of operation of the system, and if the preset hour detected by an OFF timer hour detecting means is "Y" as determined at step 301, step 302 takes place at which the air conditioner is brought to a halt. However, if the preset hour detected by the OFF timer hour detecting means is "N", step 303 takes place. If the selection of "DRIVE" by the drive control apparatus at step 303 is "N", the air conditioner is brought to a halt at step 304. On the other hand, if the selection of "DRIVE" by the drive control apparatus at step 303 is "Y", step 305 takes place. If the selection of the continuous drive air-conditioning mode by the selector means is "Y" or "N" as determined at step 305, the continuous drive air-conditioning is carried out at step 306 or the ordinary load-responsive air-conditioning is carried out at step 307, respectively.

According to the prior art drive control apparatus of FIG. 1, once a stop is selected, the air conditioner ceases its entire operation. Where with this prior art drive control apparatus a space to be air-conditioned is desired to be air-conditioned continuously to make the space comfortable to live in, the necessity occurs to select the air-conditioning mode while the selection by the drive control means is made at all times to "DRIVE". While the air-conditioning of the space to make the latter comfortable to live in can be accomplished with minimized energy consumption if the air-conditioning capacity of the air conditioner is minimized by a selection mode as hereinbefore described, the user of the air-conditioner may often feel that to keep the air-conditioner in the "DRIVE" condition at all times is not economical.

Where the drive control of the air conditioner is controlled by the drive control apparatus of the type referred to above, it may often occur that, although the user of the air conditioner desires it to be continuously operated, he or she may exercise a routine procedure (drive or stop control) to render the selection of the drive control means to "STOP" when he or she leaves the space to be air-conditioned, that is, a room, and may suspend the continuous air-conditioning he or she has desired.

Also, once the air-conditioning is suspended in the manner as hereinabove described, the temperature in the room to be air-conditioned will increase, when it has been cooled, or decrease when it has been heated, before the air-conditioner is re-started. Accordingly, subsequent to the re-start of the air-conditioner, a relatively long time is required for the temperature in the room to attain a desired value and the comfortableness of the room will be lost up until the temperature in the room attains the desired value, accompanied by an increase in electricity expenses.

According to the prior art drive control apparatus of FIG. 2, once a stop is selected, the air conditioner is brought to a halt upon arrival of time at the preset hour in the ON timer. Where with this prior art drive control apparatus a space to be air-conditioned is desired to be air-conditioned continuously to make the space comfortable to live in, the necessity occurs to select the air-conditioning mode while the selection by the drive control means is made at all times to "DRIVE" without utilizing the ON timer. While the air-conditioning of the space to make the latter comfortable to live in can be accomplished with minimized energy consumption if the air-conditioning capacity of the air conditioner is minimized by a selection mode as hereinbefore described, the user of the air-conditioner may often feel that to keep the air-conditioner in the "DRIVE" condition at all times is not economical.

Also, with the operation effected with the use of the ON timer for controlling the drive control apparatus so that, when the preset hour in the ON timer comes, the air conditioner is brought into operation, the selection of the continuous air-conditioning mode results in that, regardless of the actual load, the air conditioner may be operated with its air-conditioning capacity minimized and, therefore, the operation of the air-conditioner may not bring about effects so much as expected.

According to the prior art drive control apparatus of FIG. 3, once a stop is selected, the air conditioner ceases its entire operation before and after the arrival of the preset hour set in the OFF timer. Where with this prior art drive control apparatus a space to be air-conditioned is desired to be air-conditioned continuously to make the space comfortable to live in, the necessity occurs to select the air-conditioning mode while the selection by the drive control means is made at all times to "DRIVE" without utilizing the OFF timer. While the air-conditioning of the space to make the latter comfortable to live in can be accomplished with minimized energy consumption if the air-conditioning capacity of the air conditioner is minimized by a selection mode as hereinbefore described, the user of the air-conditioner may often feel that to keep the air-conditioner in the "DRIVE" condition at all times is not economical.

Also, with the operation effected with the use of the OFF timer for controlling the drive control apparatus so that, when the preset hour in the OFF timer comes, the air-conditioner is brought to a halt, it may often occur that, although the user of the air conditioner desires it to be continuously operated, he or she may exercise a routine procedure (drive or stop control) to render the selection of the drive control means to "STOP" and may suspend the continuous air-conditioning he or she has desired.

SUMMARY OF THE INVENTION

The present invention has been devised with the foregoing problems taken into consideration and is intended to provide an improved drive control apparatus for an air conditioner wherein, once the continuous air-conditioning mode is selected at the user's option, the continuous air-conditioning can be accomplished subsequent to the selection even though a "STOP" is selected in the course of an intermittent operation of the air-conditioning.

Another important object of the present invention is to provide an improved drive control apparatus for the air conditioner wherein, in the event that a 24-hour air-conditioning mode is preferentially selected, a compressor can be driven with its number of revolution rendered to be a predetermined speed (r.p.m.) thereby to enhance the comfortableness and also to minimize the energy consumption.

A further object of the present invention is to provide an improved drive control apparatus for the air conditioner wherein, in the event that the 24-hour air-conditioning mode is preferentially selected, the number of revolution of an indoor fan is rendered to be a predetermined speed with the indoor fan driven either continuously or intermittently to improve the comfortableness and to minimize the energy consumption.

A still further object of the present invention is to provide an improved drive control apparatus for the air conditioner wherein, in the event that the 24-hour air-conditioning mode is preferentially selected, a vertical deflector blade is shifted to a predetermined position thereby to improve the comfortableness and to minimize the energy consumption.

The present invention has been invented with the foregoing view taken into consideration to provide the drive control apparatus for the air conditioner wherein, when an ON timer is used, the selection of the continuous air-conditioning mode is possible before the arrival of the preset hour while the user need not be conscious of "DRIVE" and, also, the air conditioner can be operated under a selected one of modes including the continuous air-conditioning mode before the arrival of the preset hour, while after the arrival of the preset hour, the air-conditioning appropriate to the actual load can be accomplished.

The present invention has also been invented with the foregoing view taken into consideration to provide the drive control apparatus for the air conditioner wherein, when an OFF timer is used, and once the continuous air-conditioning mode is selected while the user need not be conscious of "DRIVE" not only before the arrival of the preset hour, but also after the arrival of the preset hour, the continuous air-conditioning can be accomplished once it has been selected before and after the arrival of the preset hour set in the OFF timer.

To this end, according to one preferred embodiment, the present invention provides a control apparatus for controlling the operation of the air conditioner, which comprises a selector means for selecting one of drive and release positions in which a 24-hour air-conditioning mode having a function of continuously maintaining a minimum air-conditioning is operated and released, respectively; a drive control means for controlling a load-responsive air-conditioning mode so that the latter can be selectively brought into operation and to a halt in dependence on a load in a space to be air-conditioned;

and a preferential output means for outputting a signal for the drive control means.

The control apparatus may further comprise a 24-hour air-conditioning mode detecting means for detecting the selection of the 24-hour air-conditioning mode in response to the signal outputted from the preferential output means, and an output means operable in response to an electric signal from the 24-hour air-conditioning mode detecting means to cause the operating frequency of a compressor to be run at a predetermined number of revolution.

Alternatively, the control apparatus may further comprise a 24-hour air-conditioning mode detecting means for detecting the selection of the 24-hour air-conditioning mode in response to the signal outputted from the preferential output means, and an output means operable in response to an electric signal from the 24-hour air-conditioning mode detecting means to continuously drive the indoor fan at a predetermined number of revolution.

Again alternatively, the control apparatus may further comprise a 24-hour air-conditioning mode detecting means for detecting the selection of the 24-hour air-conditioning mode in response to the signal outputted from the preferential output means, and an output means operable in response to an electric signal from the 24-hour air-conditioning mode detecting means to intermittently drive the indoor fan at a predetermined number of revolution.

Furthermore, the control apparatus may further comprise a 24-hour air-conditioning mode detecting means for detecting the selection of the 24-hour air-conditioning mode in response to the signal outputted from the preferential output means, and an output means operable in response to an electric signal from the 24-hour air-conditioning mode detecting means to deflect the vertical deflector blade to a predetermined position.

According to another preferred embodiment of the present invention, the present invention provides a control apparatus for controlling the operation of the air conditioner, which comprises a selector means for selecting one of drive and release positions in which a 24-hour air-conditioning mode having a function of continuously maintaining a minimum air-conditioning is operated and released, respectively; a drive control means for controlling a load-responsive air-conditioning mode so that the latter can be selectively brought into operation and to a halt in dependence on a load in a space to be air-conditioned; a preferential output means for outputting a signal from the drive control means in preference to an signal from the selector means; and an ON timer preset hour detecting means for detecting the hour preset in an ON timer for starting at such preset hour thereby to switch a signal from the preferential output means over to a signal representative of the load-responsive air-conditioning mode.

According to a further preferred embodiment of the present invention, the present invention provides a control apparatus for controlling the operation of the air conditioner, which comprises a selector means for selecting one of drive and release positions in which a 24-hour air-conditioning mode having a function of continuously maintaining a minimum air-conditioning is operated and released, respectively; a drive control means for controlling a load-responsive air-conditioning mode so that the latter can be selectively brought into operation and to a halt in dependence on a load in a space to be air-conditioned; a preferential output means for outputting a signal from the drive control means in preference to an signal from the selector means; and an OFF timer preset hour detecting means for detecting the hour preset in an ON timer for changing the drive mode at such preset hour thereby to switch a signal from the preferential output means over to a signal from the selector means.

According to the present invention, the drive control apparatus for the air conditioner can be realized in which, once the continuous air-conditioning mode is selected at the user's option, the continuous air-conditioning can be accomplished subsequent to the selection even though a "STOP" is selected in the course of an intermittent operation of the air-conditioning.

Should the 24-hour air-conditioning mode is preferentially selected, the operating frequency of the compressor can be driven at the predetermined speed and the number of revolution of the indoor fan can be rendered to be the predetermined value so that the indoor fan can be continuously operated at said number of revolution to improve the comfortableness and to minimize the energy consumption.

Also, should the 24-hour air-conditioning mode is preferentially selected, the number of revolution of the indoor fan can be rendered to be the predetermined value so that the indoor fan can be either continuously or intermittently operated at said number of revolution to improve the comfortableness and to minimize the energy consumption.

Again, should the 24-hour air-conditioning mode is preferentially selected, the vertical deflector blade can be deflected to a predetermined position to improve the comfortableness and to minimize the energy consumption.

Also, according to the present invention, the drive control apparatus for the air conditioner can be realized wherein, when an ON timer is used, the selection of the continuous air-conditioning mode is possible before the arrival of the preset hour and, also, the air conditioner can be operated under a selected one of modes including the continuous air-conditioning mode before the arrival of the preset hour, while after the arrival of the preset hour, the air-conditioning appropriate to the actual load can be accomplished.

Furthermore, according to the present invention, the drive control apparatus for the air conditioner can be realized wherein, when an OFF timer is used, and once the continuous air-conditioning mode is selected while the user need not be conscious of "DRIVE" even after the arrival of the preset hour, the continuous air-conditioning can be accomplished once it has been selected before and after the arrival of the preset hour set in the OFF timer.

BRIEF DESCRIPTION OF THE DRAWINGS

These and other objects and features of the present invention will become clear from the following description taken in conjunction with preferred embodiments thereof with reference to the accompanying drawings, in which.

DETAILED DESCRIPTION OF THE EMBODIMENTS

Figure 1:
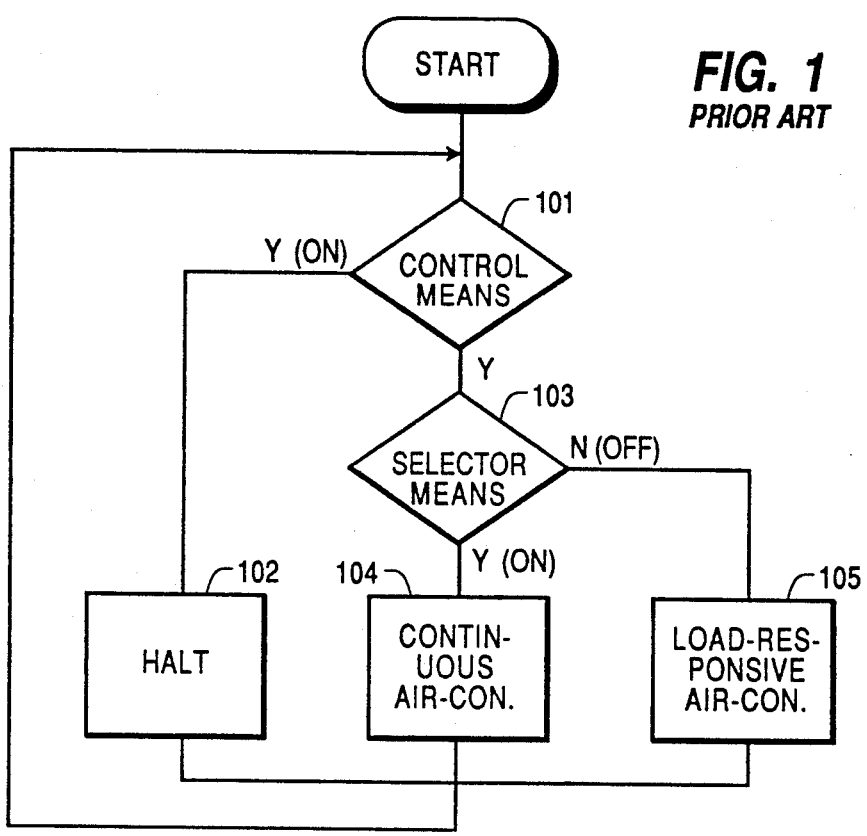
FIGS. 1 to 3 are flowcharts showing the sequences of operation of the prior art control apparatuses for the air conditioners.
Figure 2:
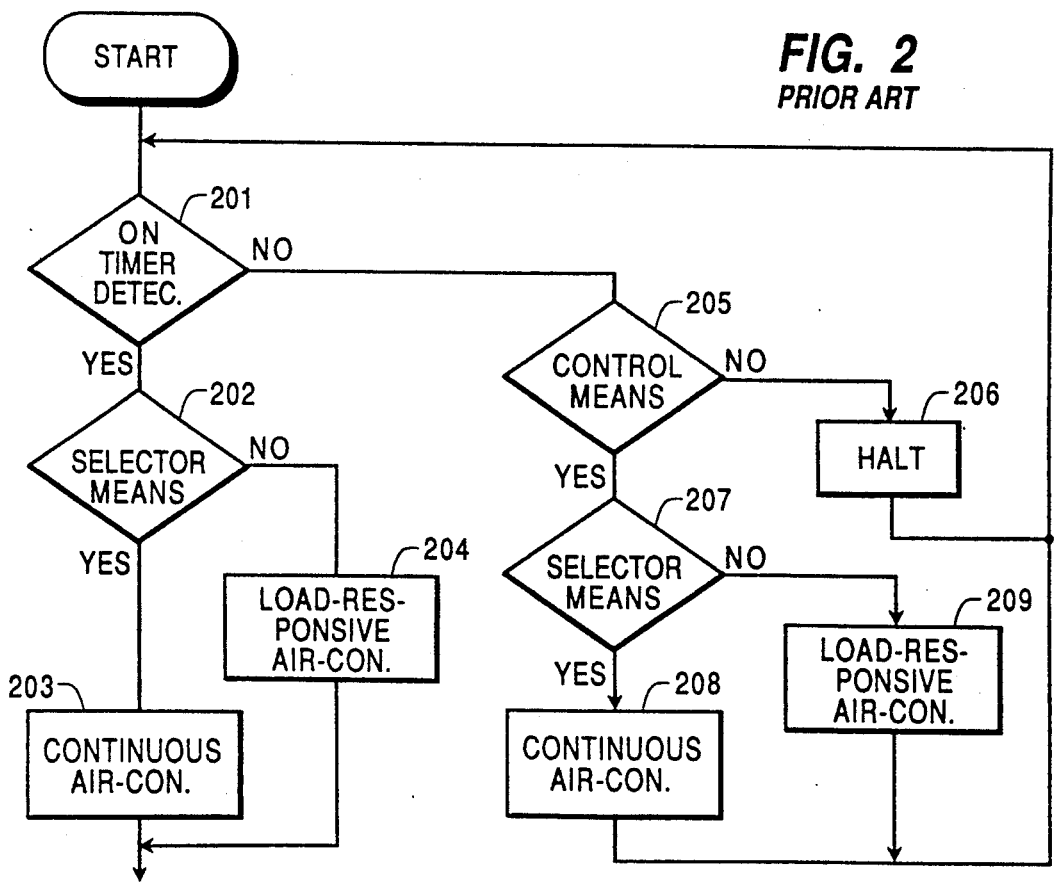
Figure 3:
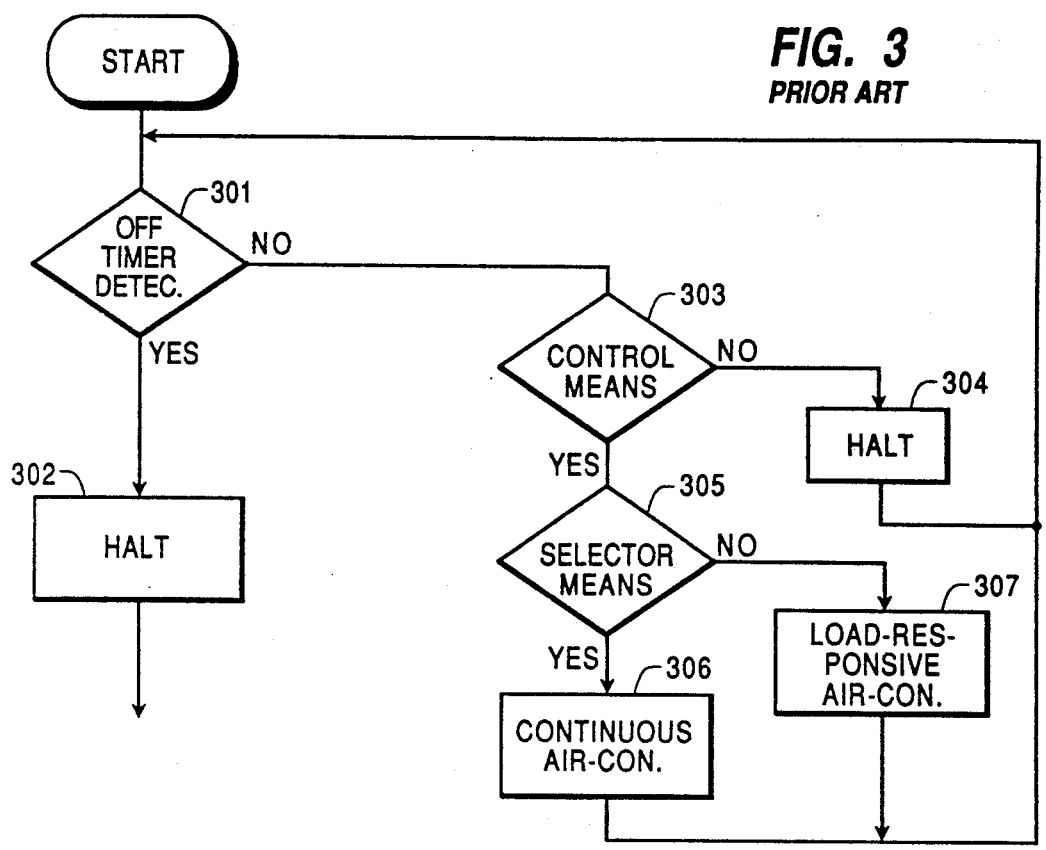

Before the description of the present invention proceeds, it is to be noted that like parts are designated by like reference numerals throughout the accompanying drawings except for FIGS. 1 to 3 which pertain to the prior art.

Figure 4:
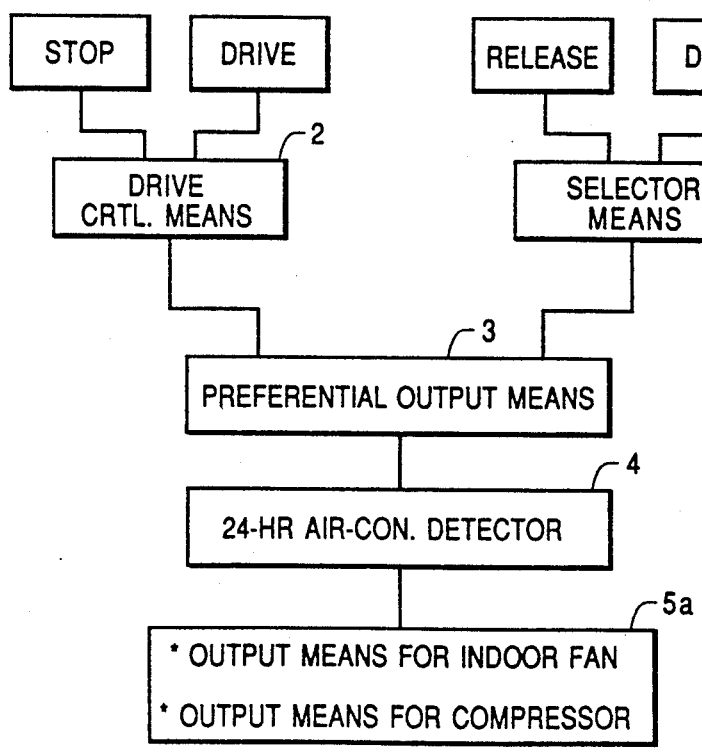
FIG. 4 is a block circuit diagram of a drive control apparatus for an air conditioner according to a first preferred embodiment of the present invention.

Referring first to FIG. 4 showing a block diagram of a drive control apparatus for an air conditioner according to a first preferred embodiment of the present invention, reference numeral 1 represents a selector means for selecting one of drive and release positions of a 24-hour air-conditioning mode in the control apparatus for controlling the operation of the air conditioner. Reference numeral 2 represents a drive control means capable of performing a control of drive and stop of a load-responsive air-conditioning mode in which the air conditioner is driven in dependence on a load in a space to be air-conditioned. Reference numeral 3 represents a preferential output means for outputting an output from the drive control means 2 in preference to an output from the selector means 1. Reference numeral 4 represents a detecting means for detecting the selection of the 24-hour air-conditioning mode by an output signal from the preferential output means 3. Reference numeral 5a represents an output means operable in response to an electric signal from the 24-hour air-conditioning mode detecting means 4 to drive the operating frequency of a compressor at a predetermined number of revolution and also to continuously drive an indoor fan, built in an indoor unit, at a predetermined speed.

Figure 5:
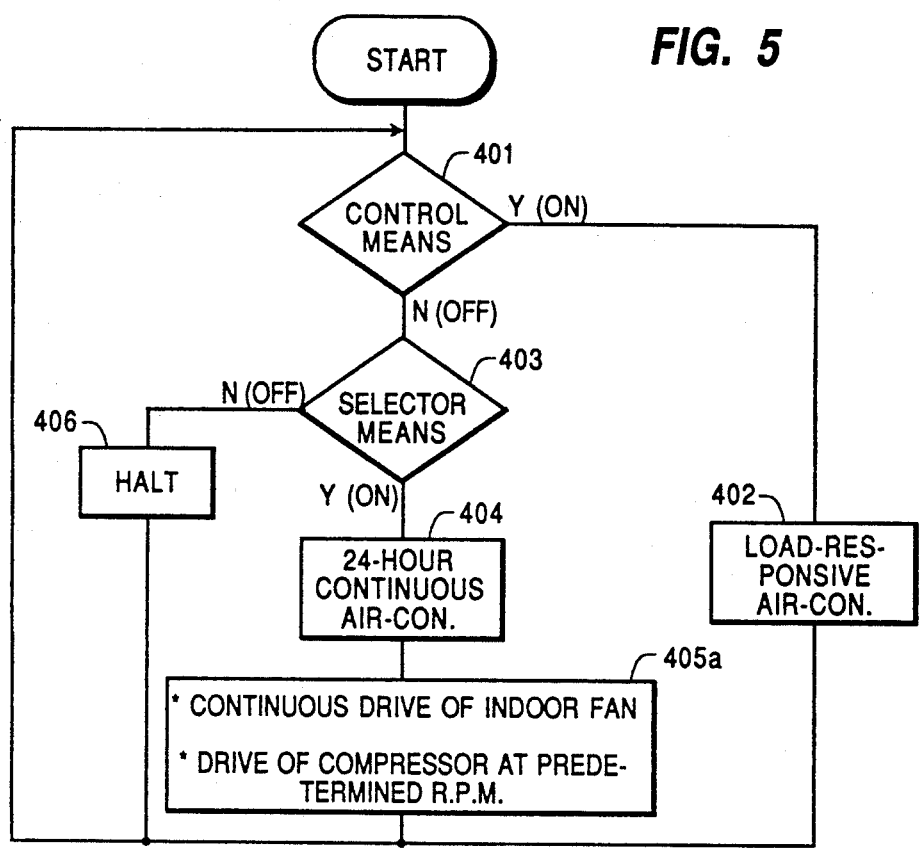
FIG. 5 is a flowchart showing the sequence of operation of the drive control apparatus shown in FIG. 4.

FIG. 5 illustrates a flowchart showing the sequence of operation of the drive control apparatus of the construction described above with reference to FIG. 4.

Referring now to FIG. 5, subsequent to the start of the operation, and if the selection of the load-responsive air-conditioning mode by the drive control apparatus is "Y" as determined at step 401, a load-responsive air-conditioning operation is performed at step 402. However, if the selection of the load-responsive air-conditioning mode is "N" as determined at step 401, a decision is made at step 403 to determine if the selection of the 24-hour air-conditioning mode by the selector means is "Y" or "N". If the result of decision at step 403 indicates "Y", the 24-hour air-conditioning operation is performed at step 404, followed by step 405a at which the operating frequency of the compressor is driven at the predetermined number of revolution and, at the same time, the indoor fan is continuously operated. On the other hand, if the result of decision at step 403 indicates "N", the air conditioner is brought to a halt at step 406.

With the drive control apparatus for the air conditioner shown by the flowchart of FIG. 5, once the drive under the 24-hour air-conditioning mode is selected through the selector means 1, the subsequent selection of the "DRIVE" under the load-responsive air-conditioning mode through the drive control means 2 results in the load-responsive air-conditioning operation, whereas the subsequent selection of the "STOP" under the load-responsive air-conditioning mode through the drive control means 2 results automatically in the 24-hour air-conditioning operation in which the operating frequency of the compressor is driven at the predetermined number of revolution and, at the same time, the indoor fan is continuously driven at the predetermined number of revolution.

Should the air conditioner is operated under the 24-hour air-conditioning mode, the operating frequency of the compressor is driven at the predetermined number of revolution (for example, at a minimum operating frequency) and, at the same time, the indoor fan can be continuously driven at the predetermined number of revolution regardless of whether or not the compressor is driven. Therefore, the indoor fan provides a circulating effect by which the difference between the respective temperatures in top and bottom regions in the space to be air-conditioned can be minimized to provide the space comfortable to live in and also to minimize energy consumption.

Also, where the load-responsive air-conditioning mode is again selected, the set-up time can be considerably shortened thereby to improve the comfortableness and also to minimize the energy consumption.

Figure 6:
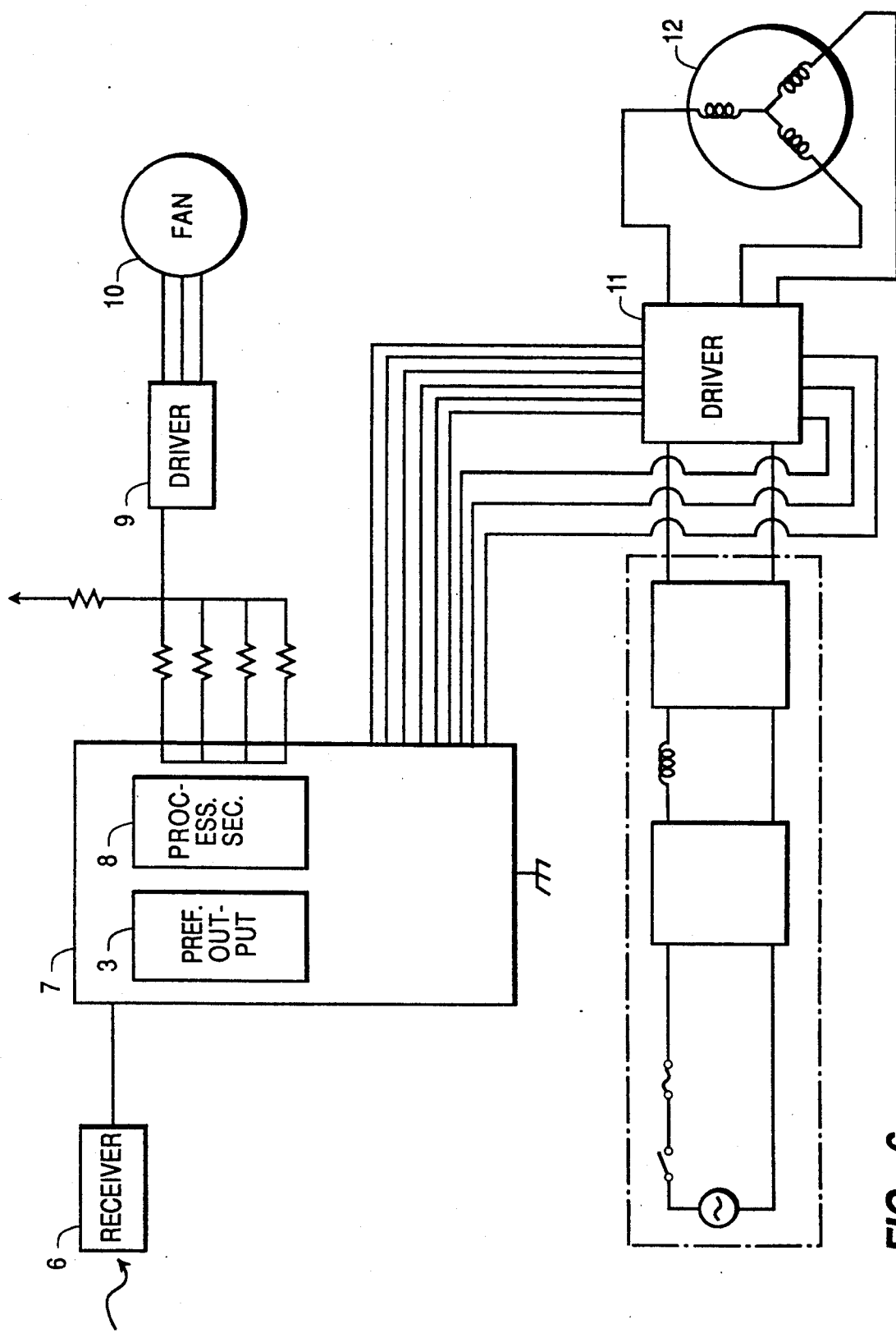
FIG. 6 is a block circuit diagram of an electric circuit used in the drive control apparatus according to the first preferred embodiment of the present invention.

FIG. 6 illustrates one embodiment of an electric circuit designed to accomplish the above described drive control in the air conditioner according to the present invention.

In FIG. 6, reference numeral 6 represents a main body receiver unit built in a main body of the air conditioner and operable to transmit to a control unit 7 a result of selection performed on a selector switch disposed on, for example, a wireless remote controller, for performing the selector means 1 of FIG. 4, or a result of selection performed on a selector switch for performing the drive control means 2. Reference numeral 3 represents the preferential output means incorporated in the control unit 7 and operable in response to a result of reception by the receiver unit 6 to preferentially transmit a result of the drive control means 2. Reference numeral 8 represents a processing section incorporated in the control unit 7 and operable in response to a result of output from the preferential output means 3 to determine one of the 24-hour air-conditioning mode and the load-responsive air-conditioning mode under which the air conditioner is to be operated. Reference numeral 10 represents the indoor fan adapted to be controlled in response to an output based on a result of decision of the processing section 8 and also to be driven by a drive device 9. Similarly, reference numeral 12 represents the compressor adapted to be controlled in response to an output based on a result of decision of the processing section 8 and also to be driven by a drive device 11.

Figure 7:
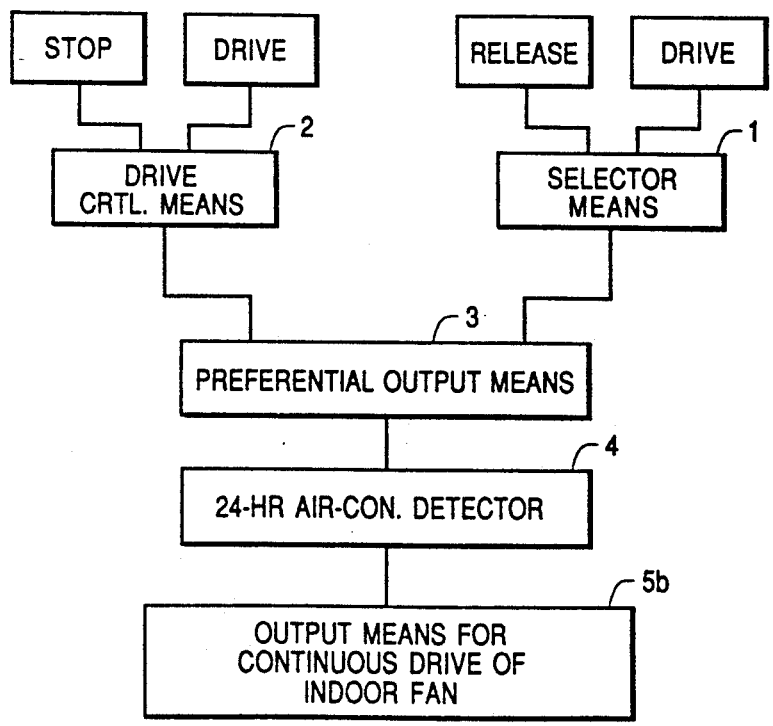
FIG. 7 is a block circuit diagram of the drive control apparatus for the air conditioner according to a second preferred embodiment of the present invention.

Referring now to FIG. 7 showing a block diagram of the drive control apparatus for an air conditioner according to a second preferred embodiment of the present invention, an output means 5b different from the output means 5a shown in and described with reference to FIG. 4 is employed which is so designed as to be operable in response to the electric signal from the 24-hour air-conditioning mode detecting means 4 to continuously drive the indoor fan at the predetermined number of revolution.

Figure 8:
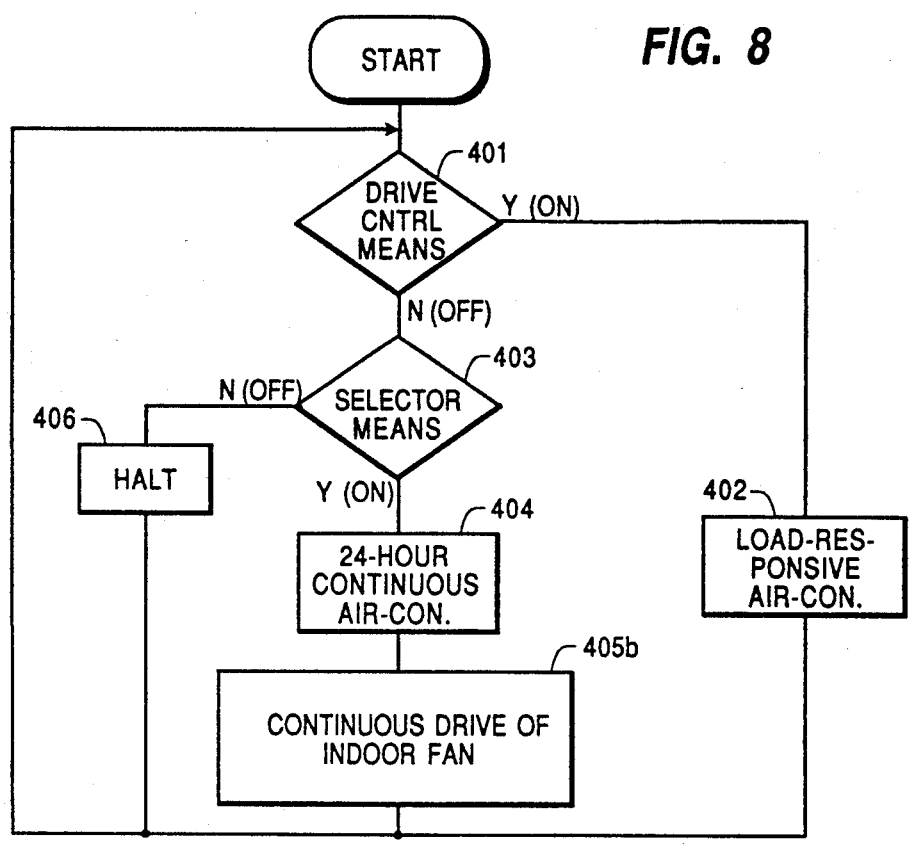
FIG. 8 is a flowchart showing the sequence of operation of the drive control apparatus shown in FIG. 7.

FIG. 8 illustrates a flowchart showing the sequence of operation of the drive control apparatus of the construction shown in FIG. 7.

The flowchart of FIG. 8 is substantially similar to that shown in FIG. 5 except that, in the flowchart of FIG. 8, step 205b is employed at which, in the event that the 24-hour air-conditioning operation is carried out at step 404, the indoor fan can be continuously driven at the predetermined number of revolution regardless of whether the compressor is being operated or held still, so that the difference between respective temperatures in top and bottom regions in the space to be air-conditioned can be minimized by the circulation effect thereby to improve the comfortableness and also to minimize the energy consumption.

Hereinafter, a third preferred embodiment of the present invention will be described with particular reference to FIGS. 9 to 11.

Figure 9:
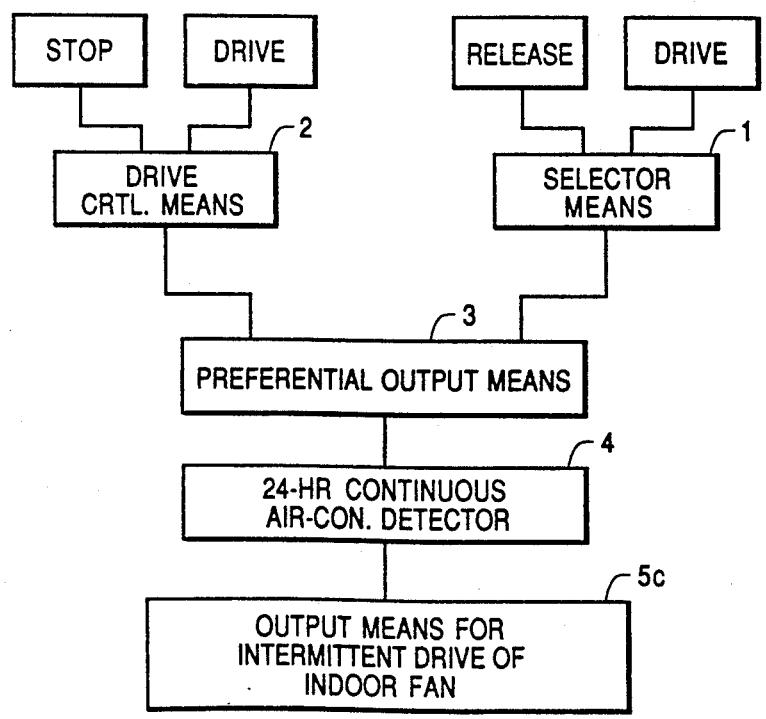
FIG. 9 is a block circuit diagram of the drive control apparatus for the air conditioner according to a third preferred embodiment of the present invention.

FIG. 9 illustrates a block diagram of the drive control apparatus for an air conditioner according to the third preferred embodiment of the present invention, an output means 5c different from any one of the output means 5a and 5b shown in FIGS. 4 and 7 is employed which is so designed as to be operable in response to the electric signal from the 24-hour air-conditioning mode detecting means 4 to intermittently drive the indoor fan at the predetermined number of revolution.

Figure 10:
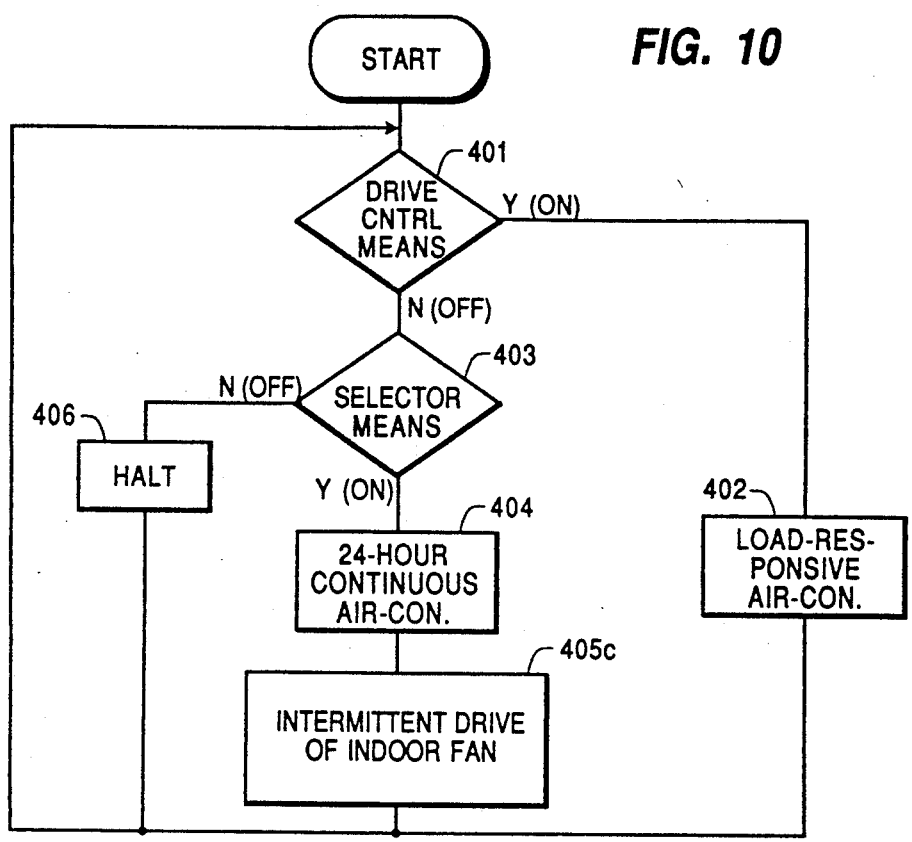
FIG. 10 is a flowchart showing the sequence of operation of the drive control apparatus shown in FIG. 9.

FIG. 10 illustrates a flowchart showing the sequence of operation of the drive control apparatus of the construction shown in FIG. 9.

The flowchart of FIG. 10 is substantially similar to that shown in FIG. 8 except that, in the flowchart of FIG. 10, step 205c is employed at which, in the event that the 24-hour air-conditioning operation is carried out at step 404, the indoor fan can be intermittently driven at the predetermined number of revolution regardless of whether the compressor is being operated or held still, so that the difference between respective temperatures in top and bottom regions in the space to be air-conditioned can be minimized by the circulation effect thereby to improve the comfortableness and also to minimize the energy consumption.

Figure 11A:
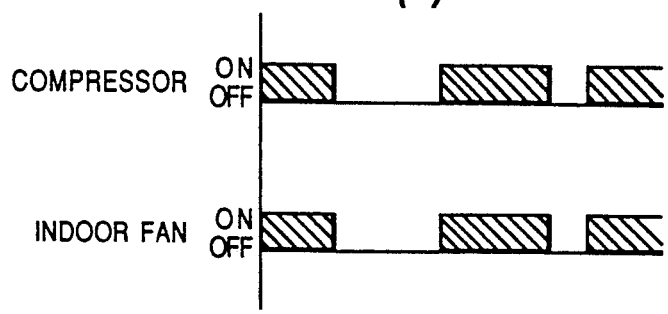
FIG. 11(a) and 11(b) are waveform diagrams showing a pattern of intermittent operation of an indoor fan.
Figure 11B:
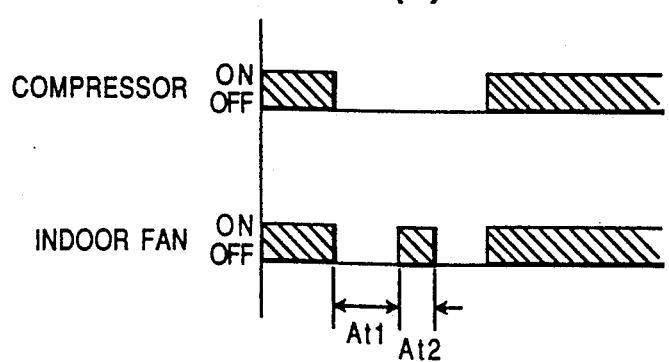

As far as the intermittent operation of the indoor fan is concerned, the drive and stop of the indoor fan may be operatively associated with the drive and stop of the compressor as shown in FIG. 11(a) and, alternatively, the indoor fan may be operated for a length of time $\Delta t2$ a predetermined time $\Delta t1$ after the stop of the compressor as shown in FIG. 11(b). (Even in this case, as a matter of course, the indoor fan is operated when the compressor is driven.)

By this control, not only can effects similar to those afforded by the second preferred embodiment of the present invention be brought about, but also the lifetime and the reliability of the indoor fan can be improved as compared with the indoor fan operated continuously such as in the second preferred embodiment of the present invention.

Figure 12:
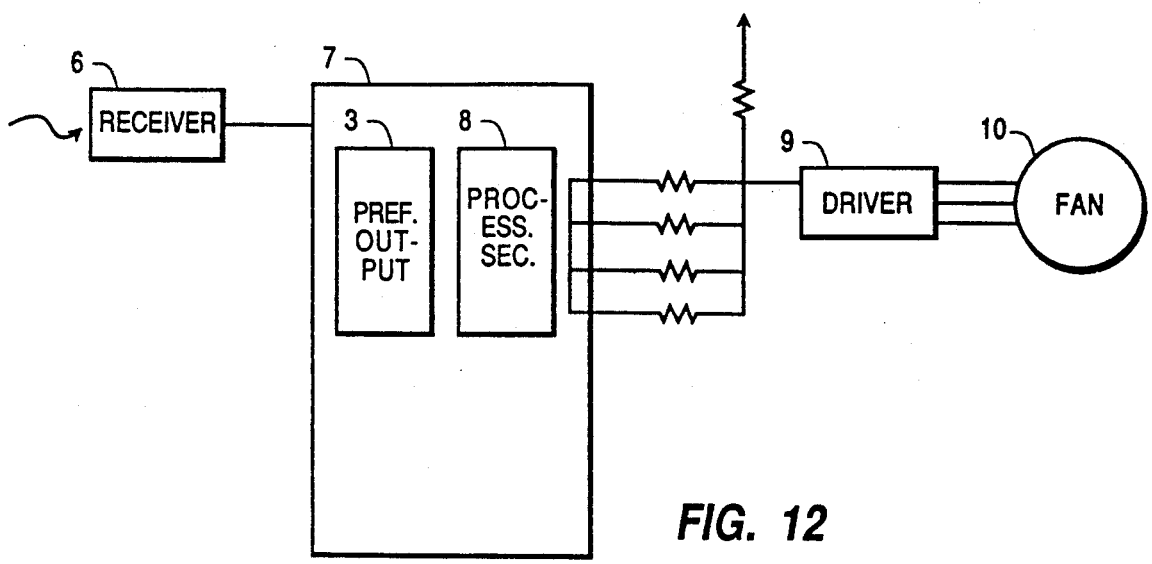
FIG. 12 is an electric circuit diagram showing one embodiment of an electric circuit used in the drive control apparatus.

FIG. 12 illustrates an electric circuit designed to accomplish the control of the air conditioner according to the third preferred embodiment of the present invention.

In FIG. 12, reference numeral 6 represents the main body receiver unit built in a main body of the air conditioner and operable to transmit to a control unit 7 a result of selection performed on a selector switch disposed on, for example, a wireless remote controller, for performing the selector means 1 of FIG. 7, or a result of selection performed on a selector switch for performing the drive control means 2. Reference numeral 3 represents the preferential output means incorporated in the control unit 7 and operable in response to a result of reception by the receiver unit 6 to preferentially transmit a result of the drive control means 2. Reference numeral 8 represents the processing section incorporated in the control unit 7 and operable in response to a result of output from the preferential output means 3 to determine one of the 24-hour air-conditioning mode and the load-responsive air-conditioning mode under which the air conditioner is to be operated. Reference numeral 10 represents the indoor fan adapted to be controlled in response to an output based on a result of decision of the processing section 8 and also to be driven by the drive device 9.

Figure 13:
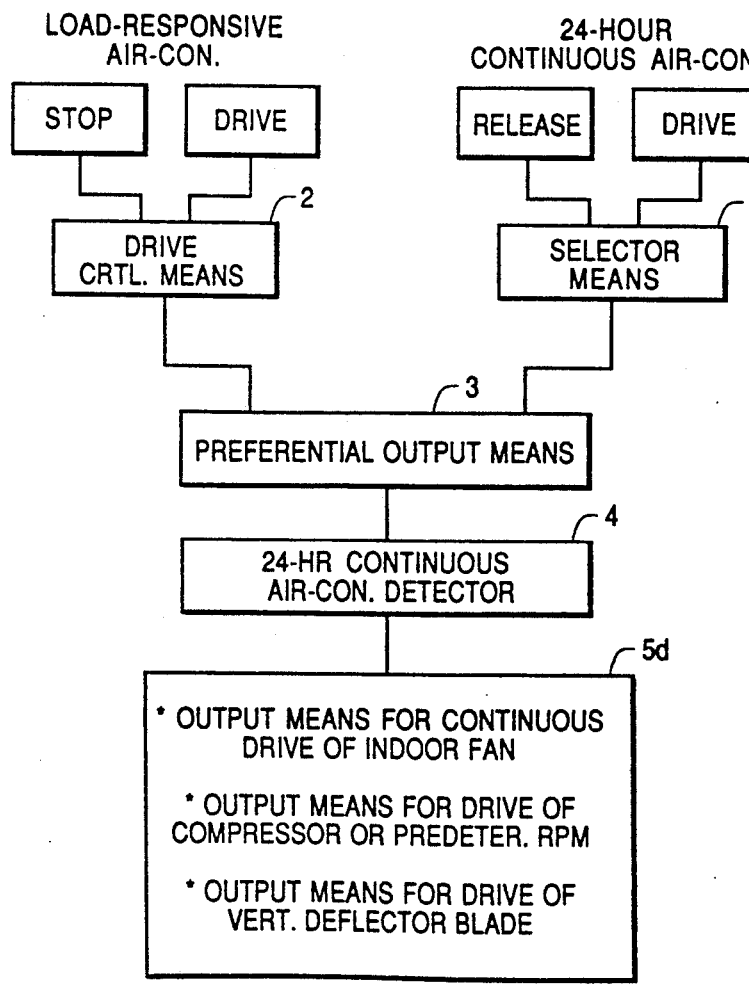
FIG. 13 is a block circuit diagram of an electric circuit used in the drive control apparatus for the air conditioner according to a fourth preferred embodiment of the present invention.

FIG. 13 illustrates a block diagram of the drive control apparatus for the air conditioner according to a fourth preferred embodiment of the present invention, an output means 5d different from the output means shown in FIG. 4 is employed which is so designed as to be operable in response to the electric signal from the 24-hour air-conditioning mode detecting means 4 to drive the operating frequency of the compressor at the predetermined number of revolution, to continuously drive the indoor fan at the predetermined number of revolution and to deflect the vertical deflector blade to a predetermined position.

Figure 14:
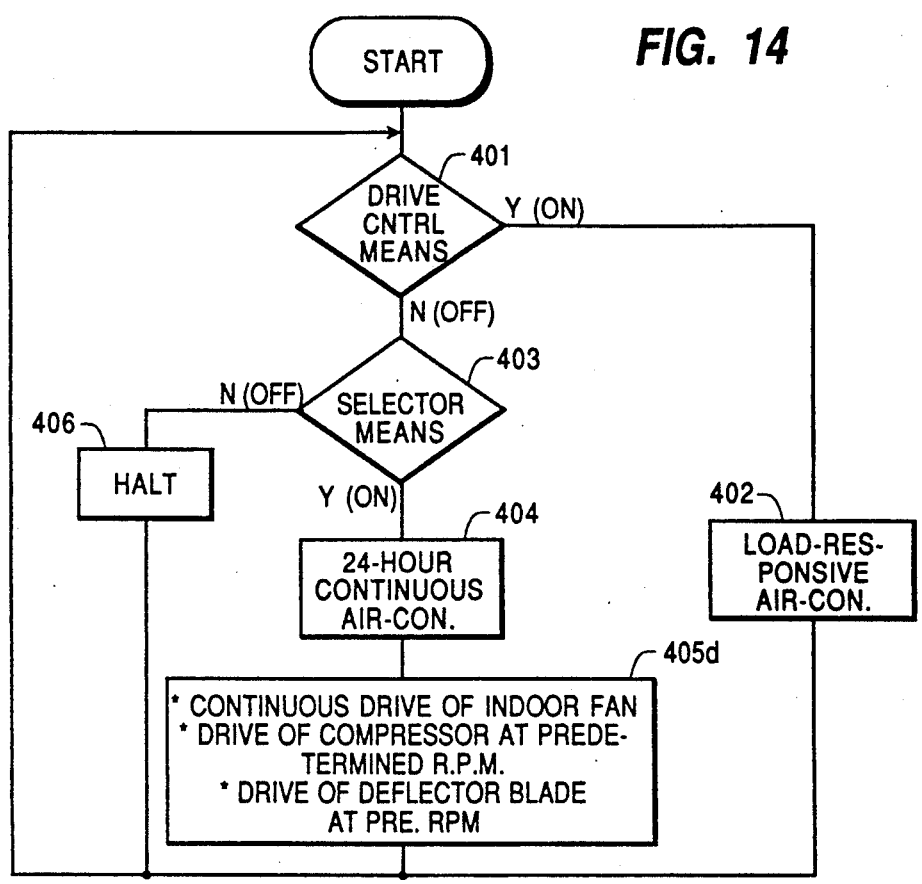
FIG. 14 is a flowchart showing the sequence of operation of the drive control apparatus shown in FIG. 13.

FIG. 14 illustrates a flowchart showing the sequence of operation of the drive control apparatus of the construction shown in FIG. 13.

The flowchart of FIG. 14 is substantially similar to that shown in FIG. 5 except that, in the flowchart of FIG. 14, step 205d is employed at which, in the event that the 24-hour air-conditioning operation is carried out at step 404, the operating frequency of the compressor can be driven at the predetermined number of revolution, the indoor fan can be continuously driven at the predetermined number of revolution and the deflector blade can be deflected to the predetermined position (for example, to a horizontal position in the case of a cooling mode or to a downwardly oriented position in the case of a heating mode) so that the difference between respective temperatures in top and bottom regions in the space to be air-conditioned can be minimized by the circulation effect thereby to improve the comfortableness and also to minimize the energy consumption.

Figure 15:
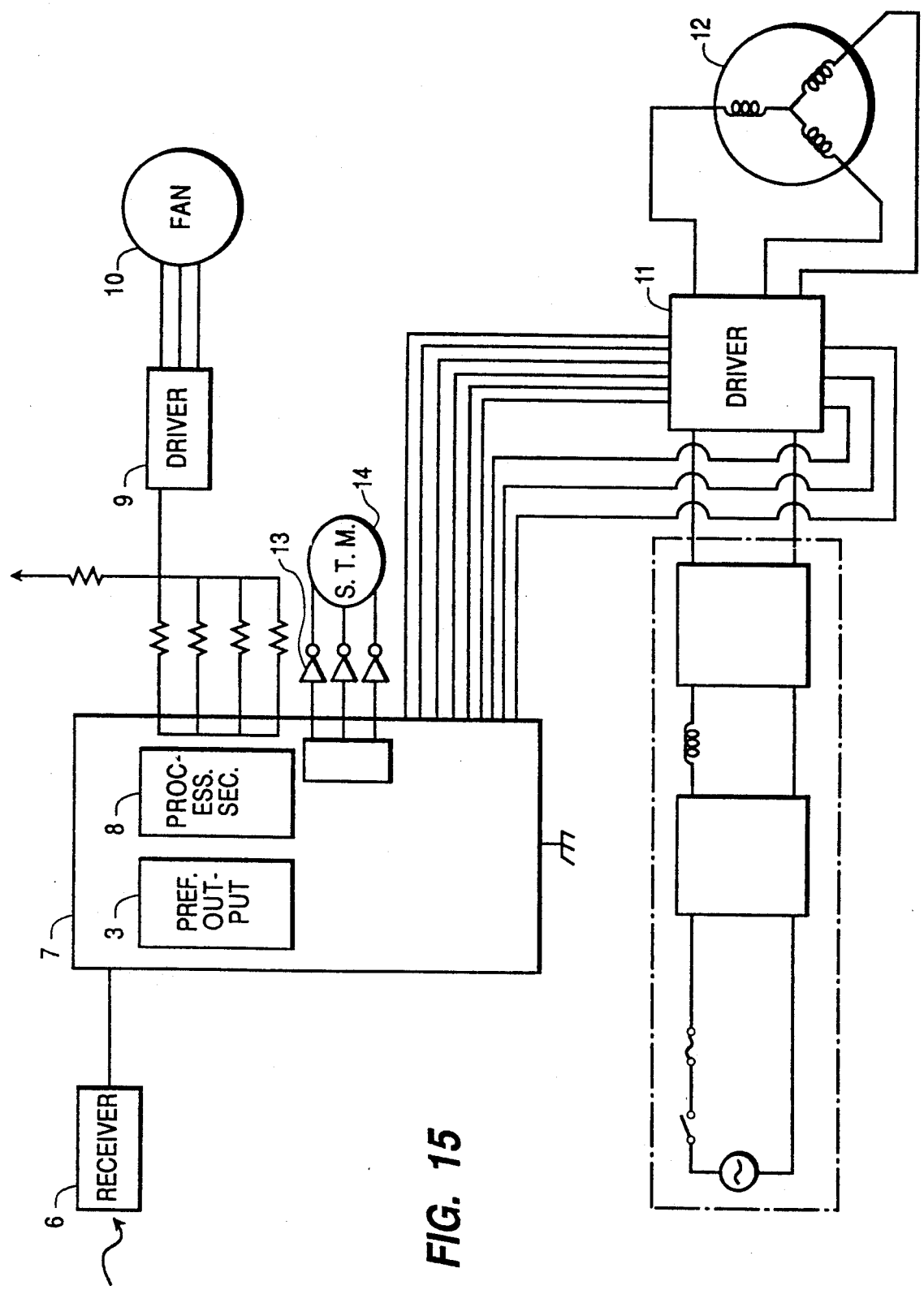
FIG. 15 is a block circuit diagram of the drive control apparatus according to the fourth preferred embodiment of the present invention.

FIG. 15 illustrates an electric circuit designed to accomplish the control of the air conditioner according to the fourth preferred embodiment of the present invention.

In FIG. 15, reference numeral 6 represents a main body receiver unit built in a main body of the air conditioner and operable to transmit to a control unit 7 a result of selection performed on a selector switch disposed on, for example, the wireless remote controller, for performing the selector means 1, or a result of selection performed on a selector switch for performing the drive control means 2. Reference numeral 3 represents the preferential output means incorporated in the control unit 7 and operable in response to a result of reception by the receiver unit 6 to preferentially transmit a result of the drive control means 2. Reference numeral 8 represents a processing section incorporated in the control unit 7 and operable in response to a result of output from the preferential output means 3 to determine one of the 24-hour air-conditioning mode and the load-responsive air-conditioning mode under which the air conditioner is to be operated. Reference numeral 10 represents the indoor fan adapted to be controlled in response to an output based on a result of decision of the processing section 8 and also to be driven by a drive device 9. Similarly, reference numeral 12 represents the compressor adapted to be controlled in response to an output based on a result of decision of the processing section 8 and also to be driven by a drive device 11. Reference numeral 14 represents a motor for the vertical deflector blade which is adapted to be driven by a drive device 13 controlled in response to an output based on a result of decision performed by the processing section 8.

Figure 16:
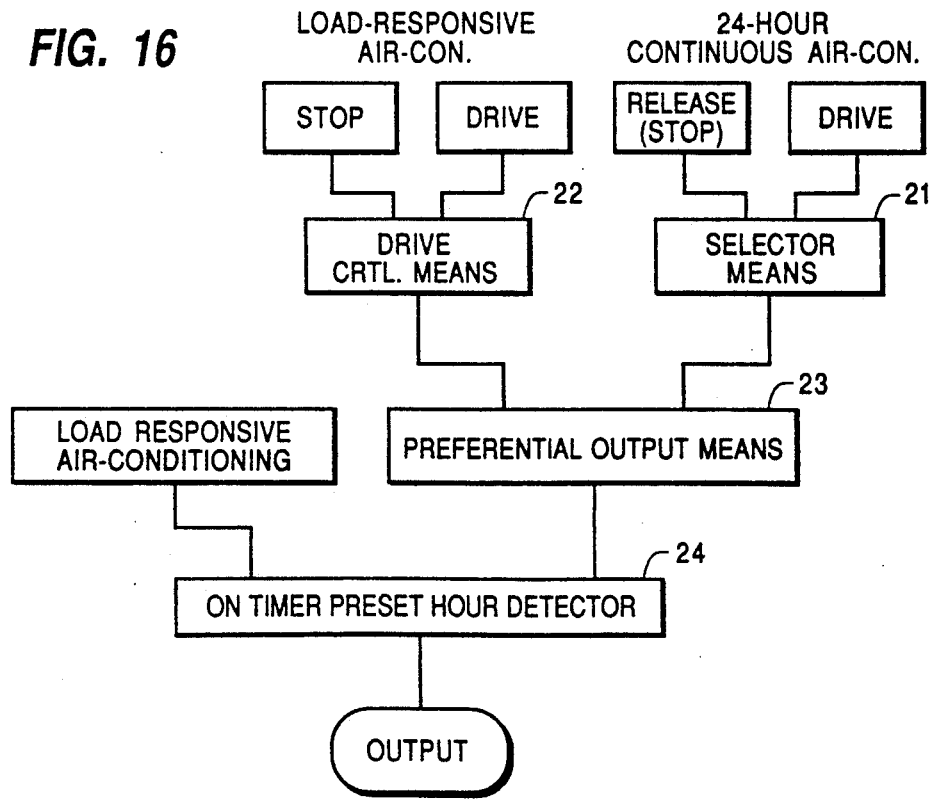
FIG. 16 is a block circuit diagram of the drive control apparatus for the air conditioner according to a fifth preferred embodiment of the present invention.

Referring now to FIG. 16 which illustrates a block diagram of the drive control apparatus for the air conditioner according to a fifth preferred embodiment of the present invention, reference numeral 21 represents a selector means for selecting one of drive and release positions of a 24-hour air-conditioning mode in the control apparatus for controlling the operation of the air conditioner. Reference numeral 22 represents a drive control means capable of performing a control of drive and stop of a load-responsive air-conditioning mode in which the air conditioner is driven in dependence on a load in a space to be air-conditioned. Reference numeral 23 represents a preferential output means for outputting an output from the drive control means 22 in preference to an output from the selector means 21. Reference numeral 24 represents a ON timer preset hour detecting means for detecting th hour preset in an ON timer to switch the output from the preferential output means 23 over to the output representative of the load-responsive air-conditioning mode.

Figure 17:
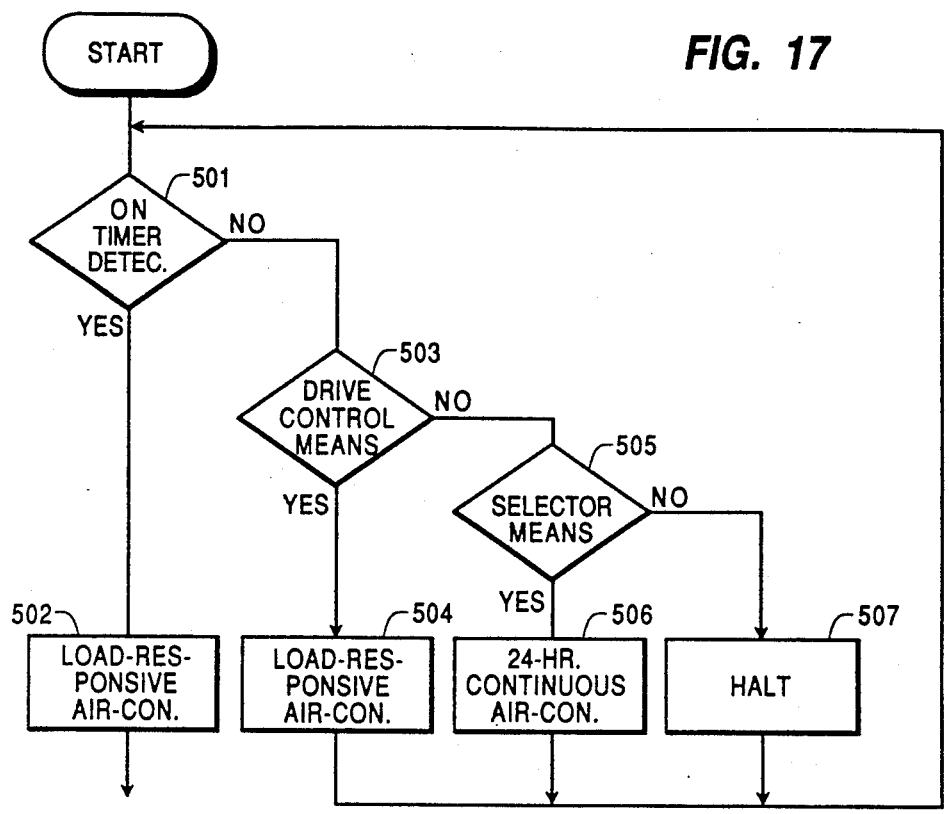
FIG. 17 is a flowchart showing the sequence of operation of the drive control apparatus shown in FIG. 16.

FIG. 17 illustrates a flowchart showing the sequence of operation of the drive control apparatus according to the fifth preferred embodiment of the present invention.

Referring now to FIG. 17, subsequent to the start of the operation, and if the preset hour detected by an ON timer hour detecting means is "Y" as determined at step 501, the load-responsive air-conditioning is performed at step 502, but if the preset hour detected by the ON timer hour detecting means is "N" as determined at step 501, the program flow proceeds to step 503. Should the selection of the load-responsive air-conditioning mode by the drive control apparatus is "Y" as determined at step 503, the load-responsive air-conditioning is performed at step 504, but should the selection of the load-responsive air-conditioning mode by the drive control apparatus is "N" as determined at step 503, the program flow proceeds to step 505. If the selection of the 24-hour air-conditioning mode by the selector means is "Y" as determined at step 505, the 24-hour air-conditioning is carried out at step 506, but if it is "N" as determined at step 505, the air conditioner is brought to a halt at step 507.

With the drive control apparatus for the air conditioner shown by the flowchart of FIG. 17, and during the ON timer-controlled operation, once the "STOP" of the load-responsive air-conditioning mode by the drive control means is selected, the subsequent selection of the "DRIVE" through the selector means can result in the 24-hour air-conditioning operation prior to the preset hour, but if the "RELEASE (or STOP)" is selected, the air conditioner can be brought to a halt and, at the same time, the load-responsive air-conditioning in dependence on the load in the space to be air-conditioned can be accomplished after the preset hour.

Figure 18:
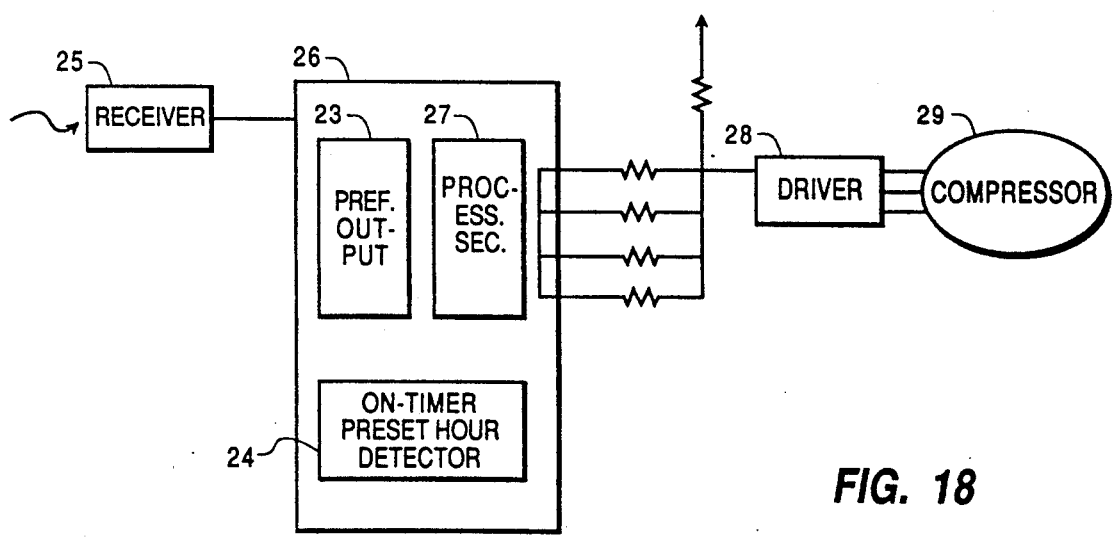
FIG. 18 is a block circuit diagram of an electric circuit used in the drive control apparatus according to the fifth preferred embodiment of the present invention.

FIG. 18 illustrates one embodiment of an electric circuit designed to accomplish the above described drive control in the air conditioner according to the present invention.

In FIG. 18, reference numeral 25 represents a main body receiver unit built in a main body of the air conditioner and operable to transmit to a control unit 26 a result of selection performed on a selector switch disposed on, for example, a wireless remote controller, for performing the selector means 21 of FIG. 16, or a result of selection performed on a selector switch for performing the drive control means 22. Reference numeral 23 represents the preferential output means incorporated in the control unit 26 and operable in response to a result of reception by the receiver unit 25 to preferentially transmit a result of the drive control means 22. Reference numeral 27 represents a processing section incorporated in the control unit 26 and operable in response to a result of output from the preferential output means 23 to determine one of the 24-hour air-conditioning mode and the load-responsive air-conditioning mode under which the air conditioner is to be operated. Reference numeral 29 represents the compressor adapted to be controlled by an output based on a result of decision of the processing section 27 and also to be driven by a drive device 28. Although in this embodiment the subject to be controlled by the 24-hour air-conditioning mode or by the load-responsive air-conditioning mode is the operating frequency of the compressor adapted to be driven by a frequency converting device, arrangement may alternatively be made wherein ON and OFF control of a solenoid coil used in a two-way valve for controlling a power control port of the compressor of constant speed having the power control port is performed. Even in this alternative arrangement, similar effects to those afforded by the fifth embodiment of the present invention can be accomplished.

Figure 19:
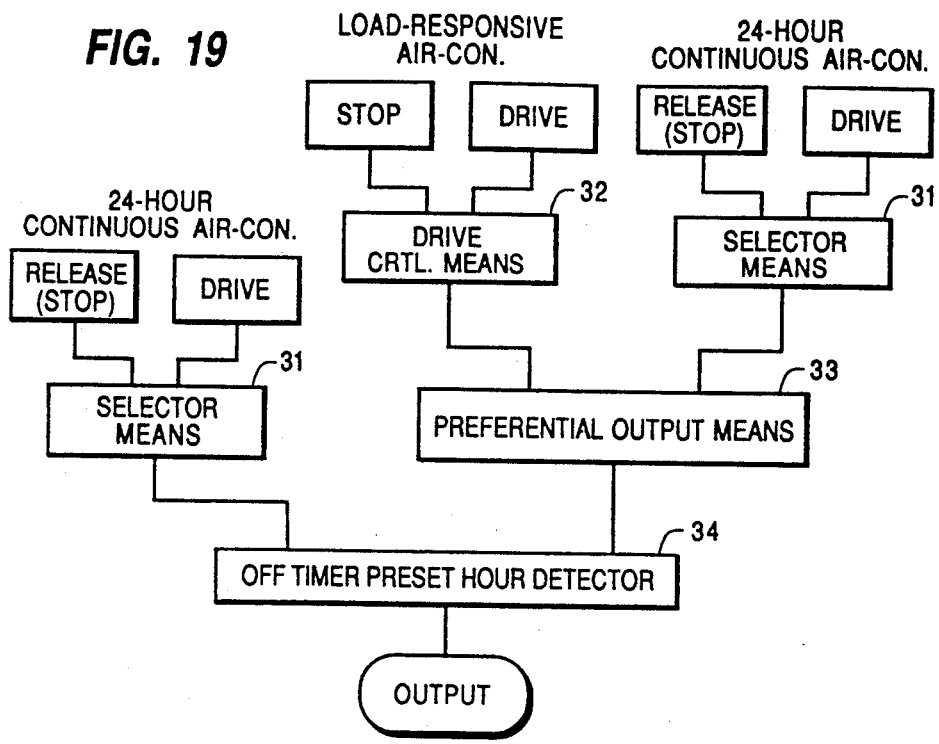
FIG. 19 is a block circuit diagram of the drive control apparatus for the air conditioner according to a sixth preferred embodiment of the present invention.

FIG. 19 illustrates a block diagram of the drive control apparatus for the air conditioner according to a sixth preferred embodiment of the present invention.

In FIG. 19, reference numeral 31 represents a selector means for selecting one of drive and release positions of a 24-hour air-conditioning mode in the control apparatus for controlling the operation of the air conditioner. Reference numeral 32 represents a drive control means capable of performing a control of drive and stop of a load-responsive air-conditioning mode in which the air conditioner is driven in dependence on a load in a space to be air-conditioned. Reference numeral 33 represents a preferential output means for outputting an output from the drive control means 32 in preference to an output from the selector means 31. Reference numeral 34 represents an OFF timer preset hour detecting means for detecting th hour preset in an OFF timer to switch the output from the preferential output means 33 over to the output from the selector means 31.

Figure 20:
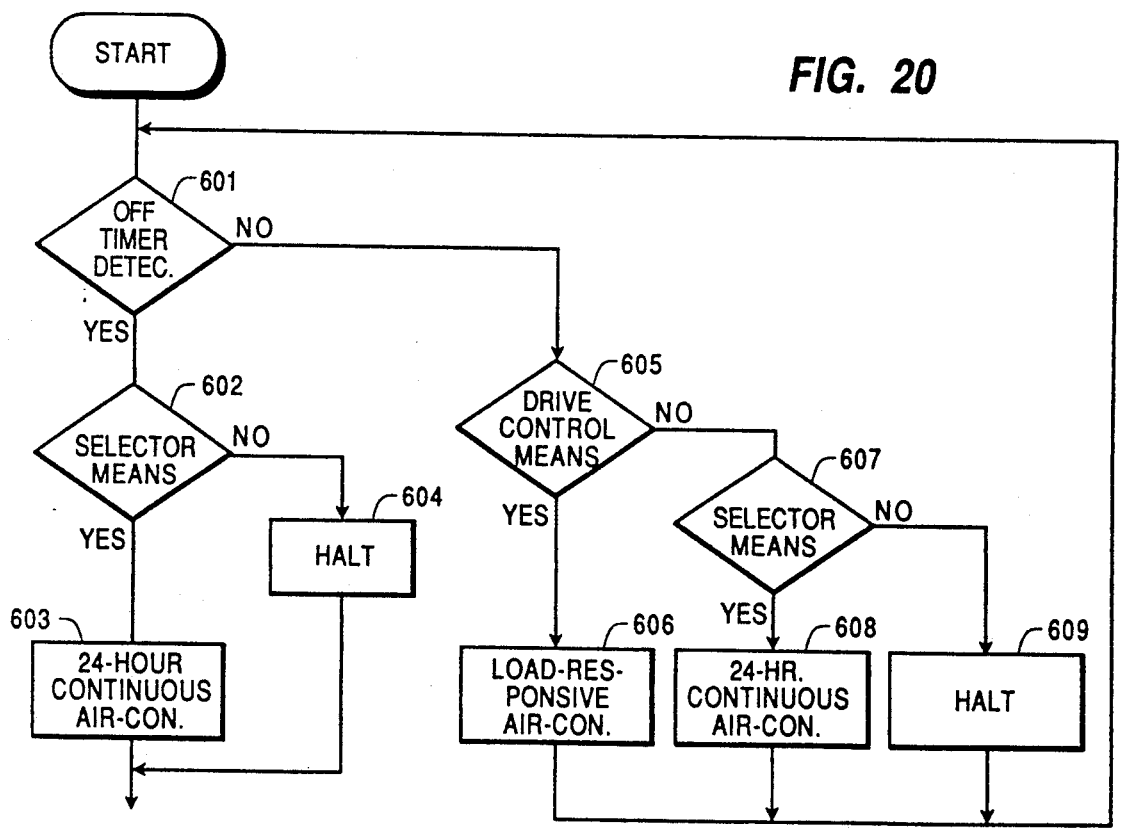
FIG. 20 is a flowchart showing the sequence of operation of the drive control apparatus shown in FIG. 19.

FIG. 20 illustrates a flowchart showing the sequence of operation of the drive control apparatus according to the sixth preferred embodiment of the present invention.

Referring now to FIG. 20, subsequent to the start of the operation, and if the preset hour detected by the OFF timer hour detecting means is "Y" as determined at step 601, a decision is made at step 602 to determine if the selection of the 24-hour air-conditioning mode by the selector means is "Y". If the result of decision at step 602 indicates "Y", the 24-hour air-conditioning is carried out at step 603, but if it indicates "N", the air conditioner can be brought to a halt at step 604. On the other hand, if the preset hour detected by the OFF timer hour detecting means is "N" as determined at step 601, the program flow proceeds to step 605. Should the selection of the load-responsive air-conditioning mode by the drive control means is "Y" as determined at step 605, the load-responsive air-conditioning is performed at step 606, but should the selection of the load-responsive air-conditioning mode by the drive control apparatus is "N" as determined at step 605, the program flow proceeds to step 607. If the selection of the 24-hour air-conditioning mode by the selector means is "Y" as determined at step 607, the 24-hour air-conditioning is carried out at step 608, but if it is "N" as determined at step 607, the air conditioner is brought to a halt at step 609.

With the drive control apparatus for the air conditioner shown by the flowchart of FIG. 20, and during the OFF timer-controlled operation, once the "DRIVE" of the 24-hour air-conditioning mode by the drive control means is selected, the subsequent selection of the "DRIVE" through the drive selector means can result in the load-responsive air-conditioning operation prior to the preset hour, but can automatically result in the 24-hour air-conditioning operation after the preset hour.

Figure 21:
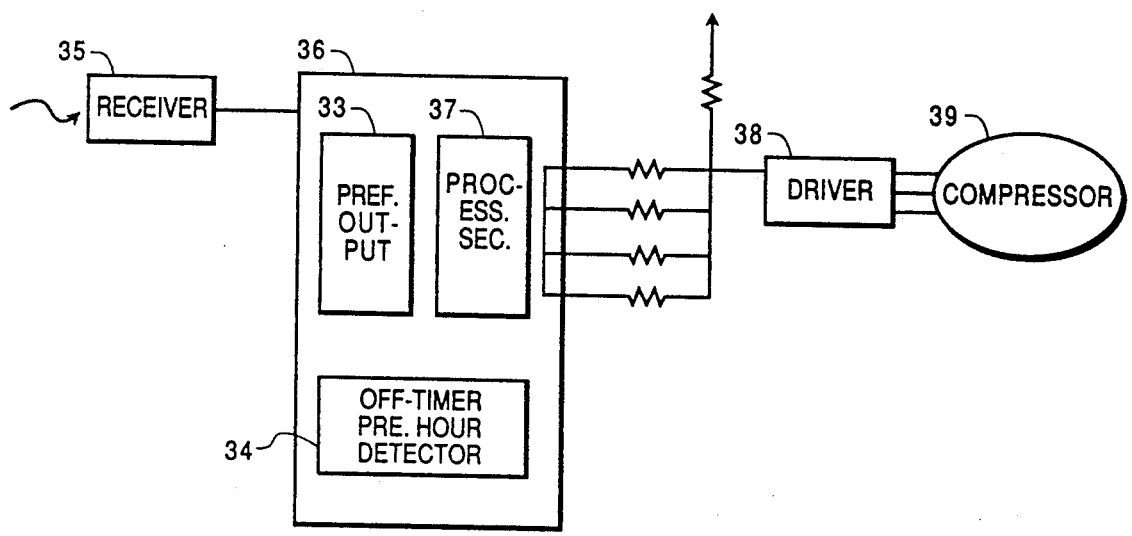
FIG. 21 is a block circuit diagram of an electric circuit used in the drive control apparatus according to the sixth preferred embodiment of the present invention.

FIG. 21 illustrates one embodiment of an electric circuit designed to accomplish the above described drive control in the air conditioner according to the sixth preferred embodiment of the present invention.

In FIG. 21, reference numeral 35 represents a main body receiver unit built in a main body of the air conditioner and operable to transmit to a control unit 36 a result of selection performed on a selector switch disposed on, for example, a wireless remote controller, for performing the selector means 31 of FIG. 19, or a result of selection performed on a selector switch for performing the drive control means 32. Reference numeral 33 represents the preferential output means incorporated in the control unit 36 and operable in response to a result of reception by the receiver unit 35 to preferentially transmit a result of the drive control means 32. Reference numeral 37 represents a processing section incorporated in the control unit 36 and operable in response to a result of output from the preferential output means 33 to determine one of the 34-hour air-conditioning mode and the load-responsive air-conditioning mode under which the air conditioner is to be operated. Reference numeral 39 represents the compressor adapted to be controlled by an output based on a result of decision of the processing section 37 and also to be driven by a drive device 38. Although in this embodiment the subject to be controlled by the 24-hour air-conditioning mode or by the load-responsive air-conditioning mode is the operating frequency of the compressor adapted to be driven by a frequency converting device, arrangement may alternatively be made wherein ON and OFF control of a solenoid coil used in a two-way valve for controlling a power control port of the compressor of constant speed having the power control port is performed. Even in this alternative arrangement, similar effects to those afforded by the fifth embodiment of the present invention can be accomplished.

As hereinbefore fully described, the control apparatus for controlling the operation of the air conditioner according to the first preferred embodiment of the present invention comprises the selector means for selecting one of drive and release positions of the 24-hour air-conditioning mode under which the air conditioner is continuously operated; the drive control means for effecting one of drive and stop controls of the load-responsive air-conditioning mode under which the air-conditioning is effected in dependence on a load in the space to be air-conditioned; and the preferential output means for outputting the signal from the drive control means. Accordingly, the drive control apparatus for the air conditioner can be realized in which, once the 24-hour air-conditioning mode having a capability of continuously maintaining the minimum air-conditioning is selected at the user's option, the continuous air-conditioning can be accomplished by an operation similar to that effected to accomplish the intermittent air-conditioning. By air-conditioning the space under the 24-hour air-conditioning mode, it is possible to create the space comfortable to live in with the air conditioner rendered easy to operate.

Should the 24-hour air-conditioning mode is preferentially selected, the operating frequency of the compressor can be driven at the predetermined speed and the number of revolution of the indoor fan can be rendered to be the predetermined value so that the indoor fan can be continuously operated at said number of revolution to improve the comfortableness and to minimize the energy consumption.

Also, should the 24-hour air-conditioning mode is preferentially selected, the number of revolution of the indoor fan can be rendered to be the predetermined value so that the indoor fan can be either continuously or intermittently operated at said number of revolution to improve the comfortableness and to minimize the energy consumption. Where the indoor fan is intermittently operated, the lifetime and the reliability of the indoor fan can be improved as compared with the indoor fan operated continuously.

Again, should the 24-hour air-conditioning mode is preferentially selected, the vertical deflector blade can be deflected to a predetermined position to improve the comfortableness and to minimize the energy consumption.

According to the second preferred embodiment of the present invention, the control apparatus for controlling the operation of the air conditioner comprises the selector means for selecting one of drive and release positions in which a 24-hour air-conditioning mode having a function of continuously maintaining a minimum air-conditioning is operated and released, respectively; the drive control means for controlling a load-responsive air-conditioning mode so that the latter can be selectively brought into operation and to a halt in dependence on a load in the space to be air-conditioned; the preferential output means for outputting a signal from the drive control means in preference to an signal from the selector means; and an ON timer preset hour detecting means for detecting the hour preset in an ON timer for starting at such preset hour thereby to switch a signal from the preferential output means over to a signal representative of the load-responsive air-conditioning mode. Accordingly, the drive control apparatus for the air conditioner can be realized in which the 24-hour air-conditioning mode having a capability of continuously maintaining the minimum air-conditioning can be selected at the user's option prior to the preset hour set in the ON timer and the air conditioner can be operated under a selected one of the modes including the 24-hour air-conditioning mode prior to the preset hour, but under the load-responsive air-conditioning mode subsequent to the preset hour. Thus, by air-conditioning the space under the 24-hour air-conditioning mode, it is possible to create the space comfortable to live in with the air conditioner rendered easy to operate.

Also, according to the third preferred embodiment of the present invention, the drive control apparatus for controlling the operation of the air conditioner, which comprises a selector means for selecting one of drive and release positions in which a 24-hour air-conditioning mode having a function of continuously maintaining a minimum air-conditioning is operated and released, respectively; a drive control means for controlling a load-responsive air-conditioning mode so that the latter can be selectively brought into operation and to a halt in dependence on a load in a space to be air-conditioned; a preferential output means for outputting a signal from the drive control means in preference to an signal from the selector means; and an OFF timer preset hour detecting means for detecting the hour preset in an ON timer for changing the drive mode at such preset hour thereby to switch a signal from the preferential output means over to a signal from the selector means. Accordingly, the drive control apparatus for the air conditioner can be realized in which the 24-hour air-conditioning mode having a capability of continuously maintaining the minimum air-conditioning can be selected at the user's option subsequent to the preset hour set in the OFF timer and, once the continuous air-conditioning mode is selected, the continuous air-conditioning can be accomplished without allowing the user to be conscious of "DRIVE" even after the arrival of the preset hour. Thus, by air-conditioning the space under the 24-hour air-conditioning mode, it is possible to create the space comfortable to live in with the air conditioner rendered easy to operate.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A drive control apparatus for an air conditioner, which comprises:
    a selector means for selecting one of drive and release positions of a 24-hour air-conditioning mode;
    a drive control means for effecting one of drive and stop controls of a load-responsive air-conditioning mode under which the air conditioner is operated in dependence on a load in a space to be air-conditioned; and
    a preferential output means for outputting a signal from the drive control means in preference to an output signal from the selector means.

2. An air conditioner which comprises:
    a drive control apparatus including a 24-hour air-conditioning mode, a selector means for selecting one of drive and release positions of the 24-hour air-conditioning mode, a load-responsive air-conditioning mode under which the air conditioner is operated in dependence on a load in a space to be air-conditioned, a drive control means for effecting one of drive and stop controls of the load-responsive air-conditioning mode, and a preferential output means for outputting a signal from the drive control means in preference to an output signal from the selector means;
    an indoor unit including an indoor heat exchanger and an indoor fan;
    a compressor for compressing a coolant, said compressor constituting a refrigerating cycle together with the indoor heat exchanger and an outdoor heat exchanger;
    a mode detecting means for detecting that the 24-hour air-conditioning mode has been detected by a signal from the preferential output means;
    an output means operable in response to an electric signal from the mode detecting means to drive an operating frequency of the compressor at a predetermined number of revolution.

3. An air conditioner as claimed in claim 2, which comprises:
    an indoor unit including an indoor heat exchanger and an indoor fan;
    a compressor for compressing a coolant, said compressor constituting a refrigerating cycle together with the indoor heat exchanger and an outdoor heat exchanger;
    a mode detecting means for detecting that the 24-hour air-conditioning mode has been detected by a signal from the preferential output means; and
    an output means operable in response to an electric signal from the mode detecting means to drive the indoor fan continuously at a predetermined number of revolution.

4. An air conditioner as claimed in claim 2, which comprises:
    an indoor unit including an indoor heat exchanger and an indoor fan;

a compressor for compressing a coolant, said compressor constituting a refrigerating cycle together with the indoor heat exchanger and an outdoor heat exchanger;

a mode detecting means for detecting that the 24-hour air-conditioning mode has been detected by a signal from the preferential output means; and an output means operable in response to an electric signal from the mode detecting means to drive the indoor fan intermittently at a predetermined number of revolution.

5. An air conditioner as claimed in claim 2, which comprises:

an indoor unit including an indoor heat exchanger and an indoor fan, said indoor unit having defined therein a discharge opening through which a stream of air having passed through the indoor heat exchanger emerges outwardly therefrom;

a vertical deflector blade disposed in the discharge opening of the indoor unit for deflecting the air stream up and down;

a compressor for compressing a coolant, said compressor constituting a refrigerating cycle together with the indoor heat exchanger and an outdoor heat exchanger;

a mode detecting means for detecting that the 24-hour air-conditioning mode has been detected by a signal from the preferential output means; and an output means operable in response to an electric signal from the mode detecting means to deflect the vertical deflector blade to a predetermined position.

6. A drive control apparatus for an air conditioner which comprises:

a selector means for selecting one of drive and release positions of a 24-hour air-conditioning mode;

a drive control means for effecting one of drive and stop controls of a load-responsive air-conditioning mode under which the air conditioner is operated in dependence on a load in a space to be air-conditioned;

a preferential output means for outputting a signal from the drive control means in preference to an output signal from the selector means;

an ON timer for setting a preset hour at which the air-conditioner is started; and a hour detecting means for detecting the preset hour for switching a signal from the preferential output means over to a signal representative of the load-responsive air-conditioning mode.

7. A drive control apparatus for an air conditioner which comprises:

a selector means for selecting one of drive and release positions of a 24-hour air-conditioning mode;

a drive control means for effecting one of drive and stop controls of a load-responsive air-conditioning mode under which the air conditioner is operated in dependence on a load in a space to be air-conditioned;

a preferential output means for outputting a signal from the drive control means in preference to an output signal from the selector means;

an OFF timer for setting a preset hour at which an operating mode is changed; and a hour detecting means for detecting the preset hour for switching a signal from the preferential output means over to a signal representative of the load-responsive air-conditioning mode.

* * * * *